United States Patent [19]
Rousseau et al.

[11] 3,812,534
[45] May 21, 1974

[54] VENTILATION DEVICE FOR A MAGNET DISK UNIT

[75] Inventors: Hubert Cecyl Albert Rousseau, Meudon; Yves-Jean Francois Brette, Sevres, both of France

[73] Assignee: Societe Industrielle Honeywell Bull (Societe Anonyme), Paris, France

[22] Filed: Sept. 19, 1972

[21] Appl. No.: 290,307

[30] Foreign Application Priority Data

Sept. 30, 1971 France .................... 71.35163

[52] U.S. Cl. .................... 360/98, 360/133
[51] Int. Cl. .................... G11b 5/60
[58] Field of Search .......... 340/174.1 E; 179/100.2; 346/137, 37 MD; 55/17, 467, 473

[56] References Cited

UNITED STATES PATENTS

| | | | |
|---|---|---|---|
| 3,631,423 | 12/1971 | Groom | 340/174.1 E |
| 3,710,540 | 1/1973 | Stansell | 340/174.1 E |
| 3,731,291 | 5/1973 | Welsh | 340/174.1 E |
| 3,717,855 | 2/1973 | Ven Acker | 340/174.1 E |
| 3,638,089 | 1/1972 | Gabor | 340/174.1 E |
| 3,720,931 | 3/1973 | Andersen | 340/174.1 E |

*Primary Examiner*—Vincent P. Canney
*Attorney, Agent, or Firm*—Fred Jacob

[57] ABSTRACT

A ventilation device is provided for magnetic disk units housed in a cartridge having openings at its sides to accommodate read and write heads, and brushes. A filtered air duct leads to the interior of the cartridge with the brushes being located in the duct. A portion of the air entering the duct is directed to the opening accommodating the heads to form a dynamic air curtain which prevents the entry of polluted air inside the cartridge.

7 Claims, 8 Drawing Figures

VENTILATION DEVICE FOR A MAGNET DISK UNIT

BACKGROUND OF THE INVENTION

The present invention relates to construction of a ventilation device designed especially, but not exclusively, for magnetic disk units used in data processing systems.

The above-referenced units are known to consist of a set of parallel disks which revolve at high speed and are housed inside of a cartridge, and of read heads, which are brought to each disk face so as to read the data carried on these faces.

The density of the data recorded on the disks and the speed of rotation of the disks have the effect of bringing the read heads a very small distance from the disk surface (several microns for a speed of 1,500 revolutions per minute). The heads are thus practically on an aerodynamic support. The problems which are consequently encountered are twofold. On the one hand, it is desirable that there be no dust on the disk surface which would carry the risk of scratching the latter and introduce noise in the emitted signals. On the other hand, the required mechanical precision demands a nearly isothermal operation so that uneven expansions of the various parts of the system are avoided.

The requirement of housing the read heads in the interior of the cartridge makes it impossible completely to isolate the interior of the cartridge from the surrounding atmosphere, which is the dust carrier. Dust will penetrate into the interior of the cartridge, both as a result of disk handling and mounting thereof in the unit, and during normal operation. Installation operations may occur several times per day and a large part of the dust contamination which occurs during these operations may be eliminated by a brushing of the disk surface immediately after installation of the cartridge in the apparatus. Unfortunately, this operation requires the insertion of brushes into the interior of the cartridge from which stems the need to provide another opening in its side wall. Such arrangement increases the probability of outside dust penetrating into the interior of the cartridge during normal operation. Because the disks are rotated rapidly they tend to draw air along with them and exert a pumping effect on the outer air in the vicinity of the openings for the insertion of the heads, or brushes into the housing.

Up to the present time the movement of the heads has been achieved by a mechanical or hydraulic drive which did not pose any special problem as far as the practically isothermal operation of the system was concerned. The air contained in the unit could be renewed by filtering. To enhance the speed and the precision of the read heads movement it has been suggested that the mechanical or hydraulic control be replaced by an electric control in which the control medium consists of a motor of the "voice-coil" type. Since the coils of these motors are fed almost continuously from the moment in which the disks begin to rotate, a non-negligible heating results which must be obviated by suitable ventilation to provide for operation of the unit at a proper temperature.

SUMMARY OF THE INVENTION

The device of the present invention meets the different demands of a read and write unit for magnetic disks and especially a need for the removal of the dust remaining on the disk before the reading due to molecular or magnetic attraction, and for the prevention of the entry of new dust during normal operation.

According to the present invention, the ventilation device for a magnetic disk unit which comprises a support for a cartridge housing at least one disk, is equipped with a first lateral opening for the insertion of brushes and a second lateral opening for the insertion of read and write heads and corresponding openings in the support, is characterized in that a duct for filtered air leads into the support opposite the first opening, while the air leaves the cartridge through the second opening, the brushes being placed in the interior of said air duct.

According to the invention, the air taken into the cartridge is filtered air. This air is driven by the pumping action due to the revolution of the disks. Impelled by the force of inertia, the air flowing at the periphery tends to escape from the cartridge through its openings, and especially in the case of magnetic disks, through the openings for the insertion of the heads.

According to another characteristic of the invention a grid whose section is approximately equal to the section of the duct, is placed interiorly of the duct in such a way that the openings of said grid are partially closed by the brush supports when these are in the rest position.

The interaction of the brush supports with the grid for the flow restriction makes it possible to obtain two types of operation; a normal operation when the supports of the part partially close the grid openings, and an accelerated operation or overflow operation when the openings are free. The latter operation is of special interest in the case in which the enclosure houses magnetic disks. At the beginning of the operation a strong flow of air dislodges the dust which had become attached to the disks during storage, during their transport, or during the installation of the cartridge in the unit.

According to another characteristic of the invention a regulating valve is placed in the inlet of the duct. This permits one to obtain a constant flow, relatively independent of the pressure at the inlet of the ventilation duct and prevents too rapid clogging of the filter. This increases filter life, the disk units being generally equipped with dust-separation filters of a very high filtering power.

BRIEF DESCRIPTION OF THE DRAWINGS

Further characteristics and advantages of this invention will evolve in the following description taken with reference to the drawings wherein.

Figure 4:
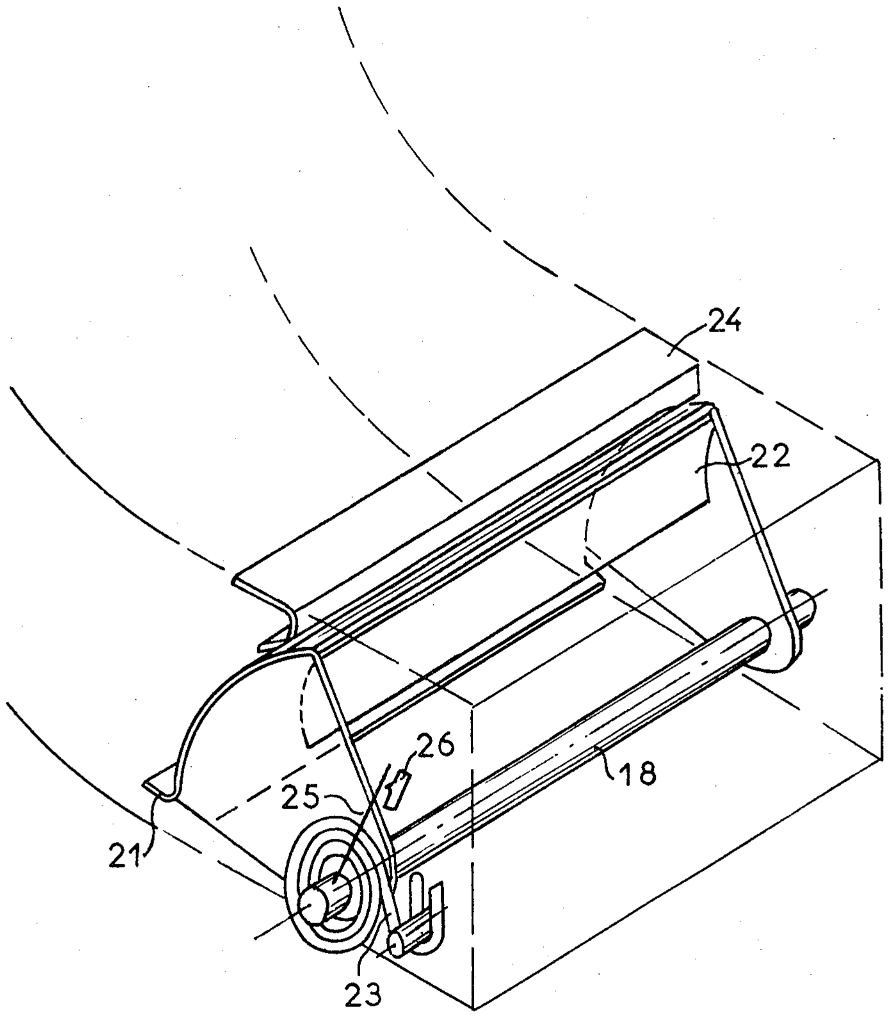

FIGS. *3a* and *3b* show two different positions of the self-regulating damper inside the duct;

FIG. 4 shows a perspective view of the self-regulating damper; and

FIGS. *5a*, *5b* and *5c* show diagrams of the aerodynamic phenomema which is involved.

DESCRIPTION OF THE PREFERRED EMBODIMENT

Figure 1:
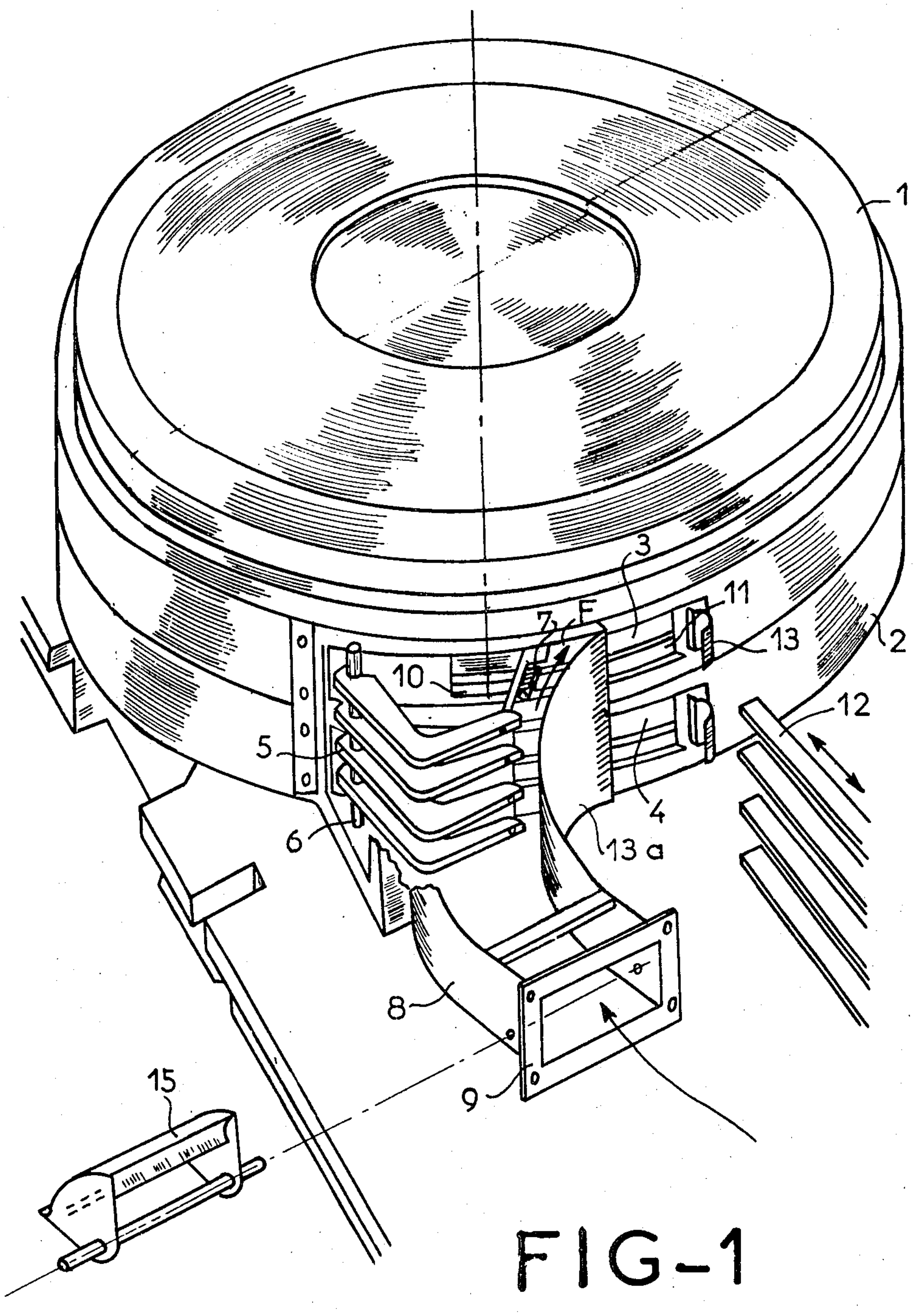
FIG. 1 shows an elevational perspective view of a set of disks in the unit.

As shown in FIG. 1, the cartridge rests on a support 2 of the read and write disk unit. The cartridge 1 encloses two disks 3 and 4. The cartridge could also only contain a single disk 3, the disk 4 being one that remains in the housing of the unit. These disks are actuated by a rotational movement by means of a mechanism engaging the hub of each disk, which mechanism is not shown.

The four brushes 7 are mounted on supports 5 which are rotatably movable around an axis 6 affixed to the support 2 of the cartridge 1.

The brush assembly is mounted in the interior of a ventilation duct 8 which is connected, on the one hand, by its face 9 to another ventilation duct leading to the outside through a filter and a fan and, on the other hand, to the interior of the cartridge through the opening 10 of the cartridge designed for the insertion of the brushes 7. The discharge of the air which is allowed to enter into the cartridge is accomplished through the openings 11 which are designed for the insertion of the read heads 12. At the outlet of the openings 11 deflectors 13 are provided to divert the air streams flowing out in the direction of the outer wall 13*a* of the duct 8 positioned opposite, so as to obtain a more regular outflow of the evacuated air.

Beside the brushes 7 and their supports 5 a grid 14 (shown in FIG. 2) for flow restriction and a self-regulating damper 15 are placed in the interior of the duct 8, but to facilitate the understanding of the drawing the damper is shown outside the duct.

Figure 2:
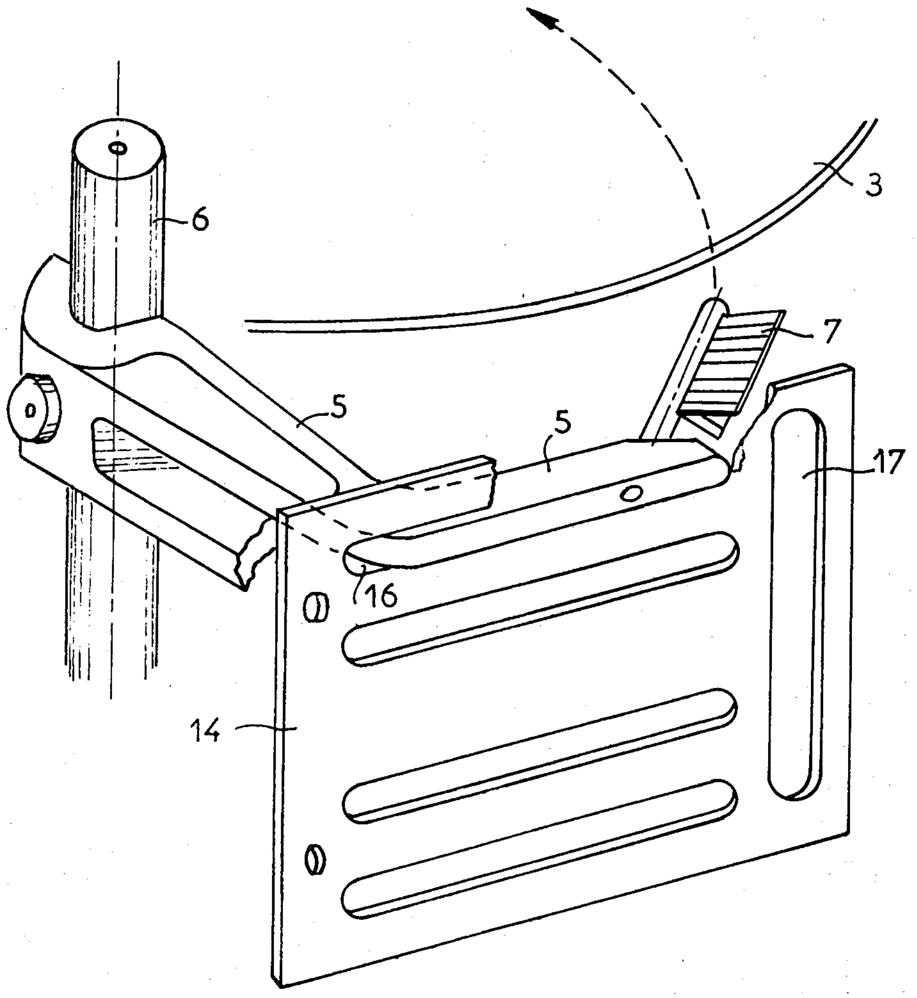
FIG. 2 shows a detailed view of the grid for flow restriction, and of the brush supports.

As previously mentioned, during the operation the air layers located in the vicinity of the disk surface are pulled along in rotation by it and are subjected to a centrifugal force which causes them to escape through the first opening which they encounter. When the air is inducted through the opening for the brushes 10 it has the tendency of being ejected through the opening 11 for the heads. FIG. 2 illustrates certain portions of FIG. 1, especially a section of the disk 3, the pivoting axis 6, a brush support 5 and a brush 7.

When the support 5 rises above the disk 3 the brush 7 revolves around its axis so as to sweep the upper surface of the disk, as a second brush, not shown, carries out the same function on the lower surface. At this time the horizontal openings 16 of the grid 14 for the restriction of the flow are free and the air located in the duct 8 penetrates into the cartridge 2 without marked resistance. On the contrary, when the brushes have completed their sweep they return to their original position which is that shown in the illustration of FIG. 2. The four horizontal openings 16 are now partially closed and the major air flow is through the vertical slot 17. This arrangement makes it possible to achieve a substantial air outflow at the time of the brushing of the disks so as to drive the dust out of the cartridge, and a more restricted outflow during the reading and writing so as to prevent the choking of the filter.

Figure 3A:
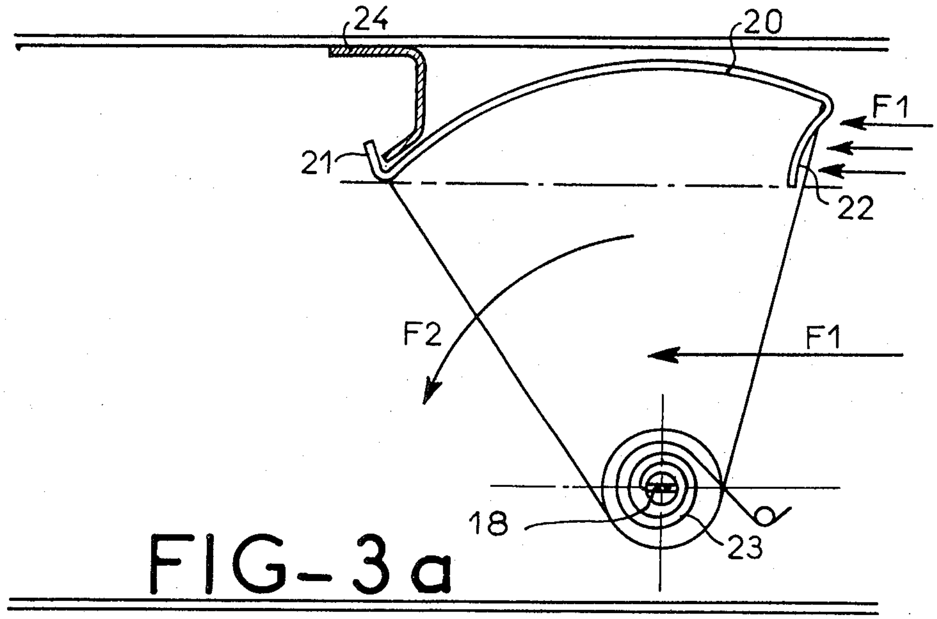
Figure 3B:
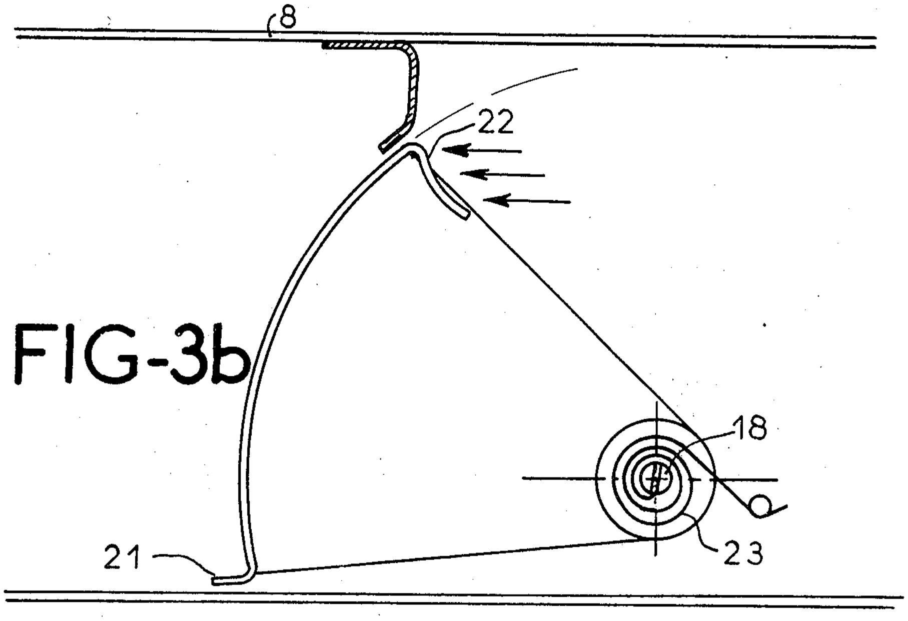

FIGS. 3*a* and 3*b* illustrates the two extreme positions of the self-regulating damper 15. In FIG. 3*a* the damper is in the open position and in FIG. 3*b* it is in the closed position. The self-regulating damper 15 is mounted so as to rotate around the axis 18 which is firmly attached to the duct 8. It consists basically of two side plates 19, which are best shown in FIG. 4, welded to a piece 20 comprising a cylindrical surface centered on the axis 18 whose ends 21 and 22 are flanged. A torsion-spring 23 exerts a torque motion which tends to return the damper to the open position in the absence of a counteracting force. This damper functions in the following manner.

Due to the effect of the spring 23, and when the air does not circulate, the damper is brought to a stop by its rim 21 held against the piece 24 (FIG. 3a). When the air is let into the duct 8 with a certain pressure in the direction indicated by arrow F1 (FIG. 3*a*) it exerts a force which is applied to the flange 22 which has a certain profile which prevents the resultant of the forces applied to it from resulting in too great a movement of the damper. Impelled by this force, the damper will rotate around the axis 18 until the moments of the spring 18 and of the force F1 in relation to this axis are equal. It thus becomes clear that the greater the pressure exerted on the flange 22, the further the damper will drop, and the higher will be the resistance against the passing of the air. At its extreme, the damper would take on the position illustrated in FIG. 3*b*, i.e., the rim 21 would come in contact with the internal wall of the duct 8 and the duct would be completely closed by the damper piece 20.

FIG. 4 shows the damper in the closed position. The down-stream pressure of the damper remains approximately constant during the operation of the disks units. It should be clearly understood that the air which is let into the interior of the cartridge must no as such carry dust. For this purpose it is carefully filtered at the inlet of the air duct. Normally the selected filter, not shown, is one of high filtering power (for instance 95 percent at 0.3 microns). The self-regulation which is introduced by the damper is designed to prevent too rapid clogging of this filter. The position of the damper could easily represent an indication of the state of the filter, as long as the air pressure exerted by the fan on the filter remains constant.

FIG. 4 shows in diagramatic form a security device giving a warning signal should the filter need to be replaced. When the pressure of the air driven by the ventilator drops too sharply (clogged filter) arm 25, in integral connection with the axis 18, acts on a miniswitch 26 which triggers the alarm.

Figure 5A:
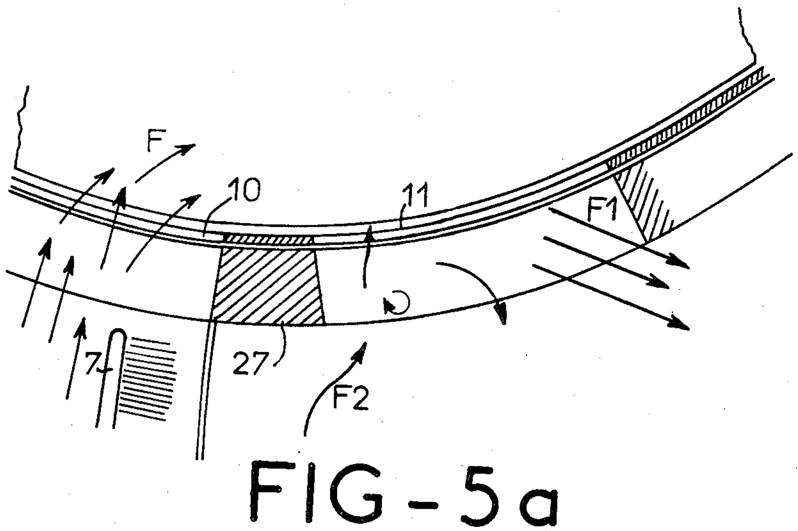
Figure 5B:
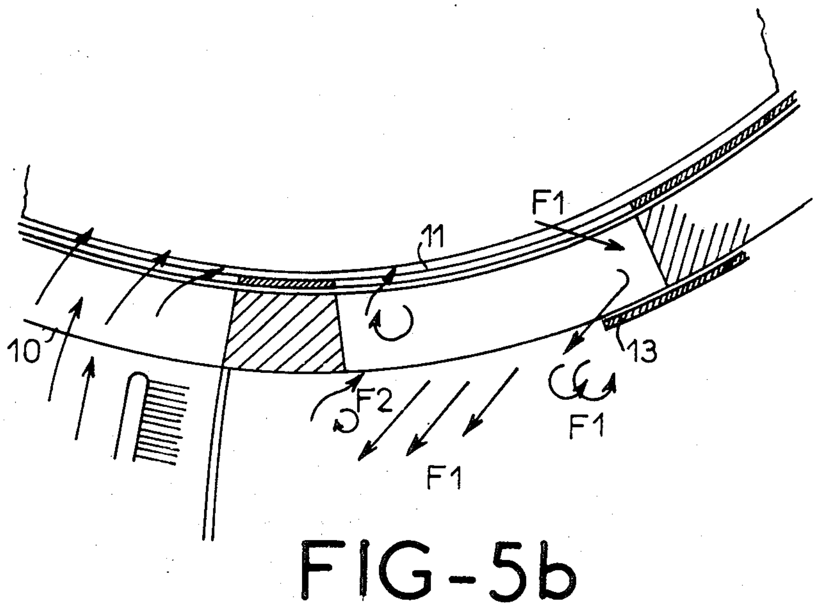
Figure 5C:
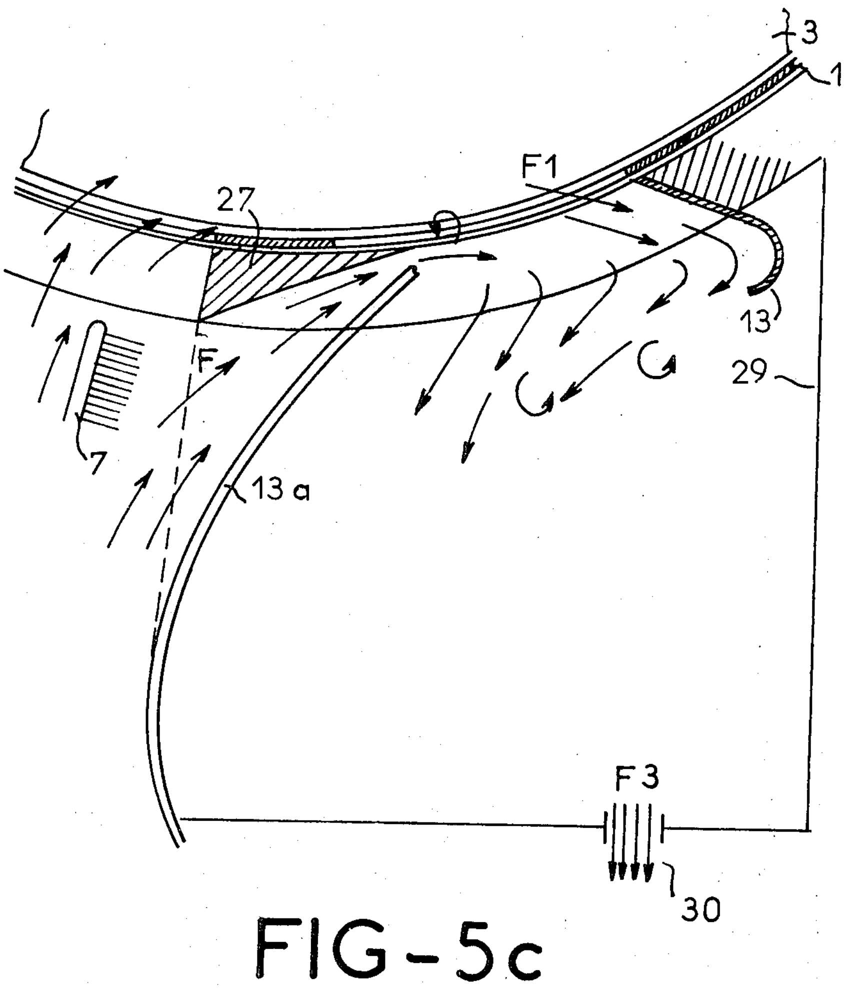

FIGS. 5*a* to 5*c* illustrate in diagramatic form the aerodynamic phenomena which occur on the level of the openings of the cartridge 1. In the three diagrams the components which appeared in FIG. 1 are to be seen again, i.e., the brushes 7, the openings 10 and 11, a disk 3 and the support 2.

The phenomena which occur in the absence of the deflector 13 are exhibited in FIG. 5*a*. The air flows into the cartridge in the directions symbolized by the arrows F. The air leaves the cartridge in the direction indicated by the arrows F1. The air flow leaving the cartridge over the right rim of the opening 11 generates a depression near the left rim of the opening. This produces a cavitation effect which exerts a pull on the air outside the cartridge 1 into its interior (represented by the arrows F2), but this air is a dust carrier. This disturbance may be reduced if a deflector 13 is installed on the support which turns the air flow leaving F1 towards the left part of the opening 11 while it partially closes said opening. The vortex phenomenon taking place in the left part of the opening is thus markedly diminished. Yet, the outer air F2 may still penetrate into the cartridge 1 (FIG. 5*b*).

According to the present invention, the inflow of polluted air is avoided if a part of the air coming from the duct 8 is detoured by means of a nozzle in the direction of the openings for the heads 11 in such a way that the air streams F arrive on the outer surface of the cartridge 1 roughly, tangentially in the vicinity of said opening (the case illustrated in FIG. 5*c*).

In addition, the deflector (s) 13 consist partially of a form of crosshead and include a rectilinear part ending in a concave flange, this rectilinear part being positioned in a direction that is parallel to the direction of the outflowing air streams. The concave flange turns down the air streams leaving in the direction of the opening for the inflow of the tangential air streams. The outflowing air current thus does not encounter any sharp edges which would cause turbulence to its outflow. During the operation of the disk unit a dynamic air curtain is created in this fashion which prevents the inflow of polluted air into the interior of the cartridge. The part 27 in FIG. 5*c* in combination with the wall 13*a* of the duct 8 provides the guidance of the air streams F.

The security of the operation may also be increased, as far as the entry of dust is concerned, in the following manner. If the opening for the heads does not lead to the exterior, but into a chamber of relatively limited dimensions (in relation to the air flow into the cartridge) an excess pressure is generated in this chamber as long as it is closed. According to the invention this excess pressure is used to have the chamber take on the function of a screen for the polluted air.

For this purpose, an air-tight chamber is selected which is equipped with a single opening for the laminar outflow of the air which is equal to the total air outflow leaving the cartridge and the flow of air introduced directly, i.e., to the air flow led into the duct 8. Such an outflow may be accomplished by numerous methods. The reliability of the operation may, furthermore, be enhanced by having the first chamber lead to a second air-tight chamber or also by linking the first chamber to the outside through a relatively long duct which would constitute a very substantial obstacle to increasing of polluted air to the chamber.

Practically, the air-tight chamber may consist of a casing which surrounds the control device for the movement of the magnetic heads, provided that the leakages which are capable of being produced once the casing is installed assure an approximately laminar outflow. FIG. 5*c* presents in diagramatic form the air-tight chamber 29 and the outflow opening 30, this outflow being denoted by the arrow F3.

What is claimed is:

1. A ventilation device for a magnetic disk unit, said ventilation device comprising a support for a cartridge containing at least one magnetic disk and having a first lateral opening for the insertion of brushes and a second lateral opening for the insertion of read and write heads, the support being fitted with corresponding first and second openings, characterized in that an air duct for filtered air leads into the support opposite the first support opening for introduction into a cartridge first opening, the support second opening forming an exit for air leaving a cartridge through a cartridge second opening, a brush for a magnetic disk positioned in the interior of the said air duct, the second opening having a rim and being equipped with vertical deflectors on that portion of said rim which is the most distant from said duct, and a nozzle built into said duct and leading tangentially to the periphery of said support in the vicinity of the rim of the second opening for diverting a part of the air current in the direction of that opening.

2. A device according to claim 1, characterized in that the abovementioned second opening leads into a roughly air-tight chamber, fitted with at least one opening for the laminar outflow of the air located therein at a flow equal to the airflow entering the duct.

3. A device according to the one of claim 2, characterized by a self-regulating damper being placed at the entry of the duct.

4. A device according to claim 3, characterized by the aforementioned self-regulating damper being equipped with an arm which at a set extreme position of the damper triggers an alarm signal through a miniswitch.

5. A ventilation device for a magnetic disk unit comprising means for supporting a cartridge containing at least one disk, and wherein said cartridge has a first opening formed in the wall thereof for entry of brushes and a second opening formed in the airtight wall for entry of read and write heads, duct means for directing filtered air into said cartridge and having one opening in registry with said first cartridge opening and the opposite opening disposed for receiving filtered air, nozzle means disposed adjacent said one duct opening for directing a portion of the air flowing into said first opening in the direction of the rim of said second opening, and deflector means disposed adjacent said rim of said second opening for turning said air stream back across said second opening to thereby create a dynamic air curtain which prevents the inflow of polluted air through said second opening.

6. The structure of claim 5 wherein said brushes are disposed in said duct means.

7. The structure of claim 5 which further includes damper means disposed in said duct means for regulating the flow of air therethrough, said damper means being pivotably supported and spring biased in the position, said damper having a first concave surface located in said air flow whereby said damper is moved toward the closed position against said spring bias caused by the air flow, and a second surface effective to diminish the air flow which surface is rotated into said air flow when said damper is so moved toward the closed position.

* * * * *